April 30, 1935.  G. HESS  1,999,236

INSTRUMENT FOR PLOTTING MAPS FROM PHOTOGRAPHS

Filed Sept. 29, 1934

Inventor:
Gustav Hess.

Patented Apr. 30, 1935

1,999,236

UNITED STATES PATENT OFFICE 1,999,236

INSTRUMENT FOR PLOTTING MAPS FROM PHOTOGRAPHS

Gustav Hess, Jena, Germany, assignor to firm of Carl Zeiss, Jena, Germany

Application September 29, 1934, Serial No. 746,160
In Germany October 10, 1933

4 Claims. (Cl. 33—20)

I have filed an application in Germany, October 10, 1933.

The invention concerns an instrument to be used together with a reflecting stereoscope and adapted to plot maps from stereoscopical photographs, especially vertical photographs, taken from aircraft, the instrument being provided to this effect with the two elements of a stereoscopical mark, which are adjustable relatively to each other in the direction of their line of interconnection and coordinated to a plotting pencil disposed between the holders carrying them.

According to the invention, an instrument of this kind is especially handy and easily transportable when it may move freely, that is to say without any guides, relatively to the table supporting the plotting paper and the stereoscopical photographs.

The measuring elements are suitably disposed on transparent plates, for instance glass plates, and, in the measuring process, at least those parts of the plates which are provided with the measuring elements are to lie near the photographs.

These transparent plates are conveniently portions of spherical bodies having the measuring elements at their bottom, and it is advisable to so mount each plate on a holder that it is rotatable relatively to this holder about an axis parallel to the line interconnecting the two measuring elements.

Figure 1:
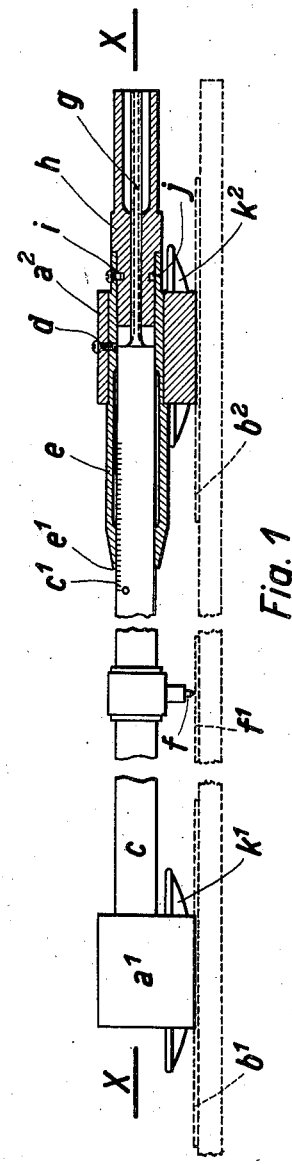
Figure 2:
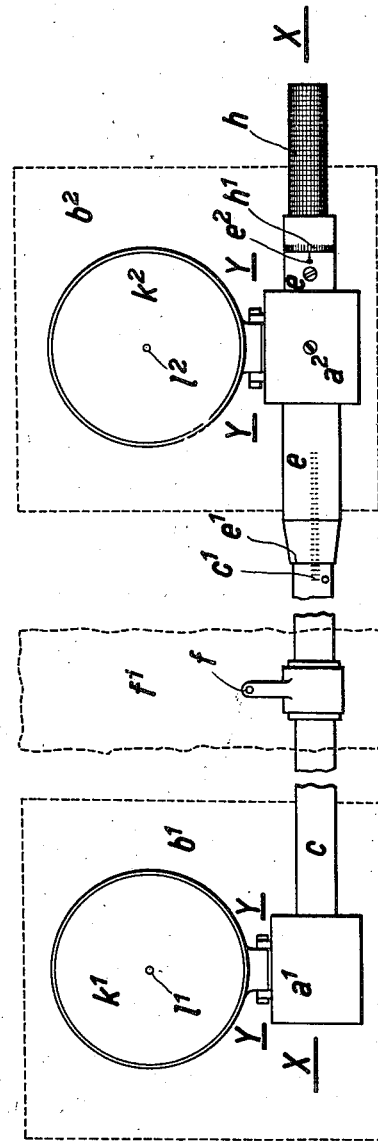

In the accompanying drawing, which illustrates the invention and represents a constructional example of an instrument for plotting maps from photographs, Figures 1 and 2 show the instrument in part-sectional elevation and in top view, respectively.

The instrument according to the drawing has two supporting bodies $a^1$ and $a^2$ which are to lie on the photographs $b^1$ and $b^2$, respectively. The photographs $b^1$ and $b^2$ represent a steroscopic photograph of a landscape. The supporting body $a^1$ is connected to a rod $c$. This rod $c$ is so disposed in a sleeve $e$ fixed to the other supporting body $a^2$ by means of a screw $d$ as to be adjustable in the direction of its axis X—X. Approximately in the middle betwen the two supporting bodies $a^1$ and $a^2$, the said rod $c$ is provided with a plotting pencil $f$ cooperating with a plotting surface $f^1$. To the rod $c$ is connected a threaded spindle $g$ which meshes with a nut $h$ rotatably mounted in the sleeve $e$. A pin $i$ screwed into the sleeve $e$ extends into an annular groove $j$ in the nut $h$ and thus connects the sleeve $e$ and the nut $h$ coaxially. The position of the sleeve $e$ relative to the rod $c$ is coarsely indicated by the edge $e^1$ of the sleeve $e$ on the scale $c^1$ of the rod $c$. The fine indication is effected by means of an index $e^2$ on the sleeve $e$ and a scale $h^1$ on the nut $h$. On the supporting bodies $a^1$ and $a^2$ are mounted portions spherical glass bodies $k^1$ and $k^2$, respectively, which are rotatable about an axis Y—Y parallel to the axis X—X of the rod $c$. The bottoms of these glass bodies $k^1$ and $k^2$ are provided with measuring elements $l^1$ and $l^2$, respectively, and lie on the photographs $b^1$ and $b^2$, respectively. As is illustrated in the drawing, it is advisable to provide that the line interconnecting the two measuring elements $l^1$ and $l^2$ is parallel to the axis X—X of the rod $c$.

I claim:

1. An instrument to be used together with a reflecting stereoscope and adapted to plot maps from stereoscopical photographs, especially vertical photographs, taken from aircraft, these two photographs lying near each other on a table and having a plotting paper between them, the said instrument having two holding bodies and a straight guide along which these two holding bodies are adjustable relatively to each other, the two holding bodies having a surface that is parallel to the straight guide and upon which the two holding bodies rest on the table, the two holding bodies being adapted to be freely displaced together with the said straight guide without the necessity of guides, each of the two holding bodies having one element of a stereoscopical mark, these two elements lying in the measuring process on the photographs and being so positioned relatively to each other that their line of interconnection is parallel to the said straight guide, and a plotting pencil disposed on this straight guide.

2. An instrument to be used together with a reflecting stereoscope and adapted to plot maps from stereoscopical photographs, especially vertical photographs, taken from aircraft, these two photographs lying near each other on a table and having a plotting paper between them, the said instrument having two holding bodies and a straight guide along which these two holding bodies are adjustable relatively to each other, the two holding bodies having a surface that is parallel to the straight guide and upon which the two holding bodies rest on the table, the two holding bodies being adapted to be freely displaced together with the said straight guide without the necessity of guides, each of the two holding bodies having a transparent plate at least part of which lies during the measuring process on the appertaining photograph, each of these two parts being provided with one of the said elements, these two elements being so positioned relatively to each other that their line of interconnection is parallel to the said straight guide, and a plotting pencil disposed on this straight guide.

3. An instrument to be used together with a reflecting stereoscope and adapted to plot maps from stereoscopical photographs, especially vertical photographs, taken from aircraft, these two photographs lying near each other on a table and having a plotting paper between them, the said instrument having two holding bodies and a straight guide along which these two holding bodies are adjustable relatively to each other, the two holding bodies having a surface that is parallel to the straight guide and upon which the two holding bodies rest on the table, the two holding bodies being adapted to be freely displaced together with the said straight guide without the necessity of guides, each of the two holding bodies having a transparent portion of a spherical body whose bottom lies during the measuring process on the appertaining photograph, one element of a stereoscopical mark being provided in the bottom of each body, these two bodies having during the measuring process such a position relatively to each other that the line interconnecting the said two elements is parallel to the said straight guide, and a plotting pencil disposed on the said straight guide.

4. An instrument to be used together with a reflecting stereoscope and adapted to plot maps from stereoscopical photographs, especially vertical photographs, taken from aircraft, these two photographs lying near each other on a table and having a plotting paper between them, the said instrument having two holding bodies and a straight guide along which these two holding bodies are adjustable relatively to each other, the two holding bodies having a surface that is parallel to the straight guide and upon which the two holding bodies rest on the table, the two holding bodies being adapted to be freely displaced together with the said straight guide without the necessity of guides, a transparent portion of a spherical body being so disposed on each of the said holding bodies as to be rotatable about an axis parallel to the said straight guide, the bottom of each of the said two bodies lying during the measuring process on the appertaining photograph, one element of a stereoscopical mark being provided in the bottom of each body, these two bodies having during the measuring process such a position relatively to each other that the line interconnecting the said two elements is parallel to the said straight guide, and a plotting pencil disposed on the said straight guide.

GUSTAV HESS.